United States Patent [19]

Hueste et al.

[11] Patent Number: 5,156,324
[45] Date of Patent: Oct. 20, 1992

[54] SOLDER APPARATUS WITH DUAL HOLLOW WAVE NOZZLES

[75] Inventors: Greg L. Hueste, Camdenton; Francis L. Ring, Lebanon, both of Mo.

[73] Assignee: Electrovert LGD, La Prairie, Canada

[21] Appl. No.: 853,068

[22] Filed: Mar. 17, 1992

[51] Int. Cl.⁵ .......................... B23K 1/00; B23K 3/00
[52] U.S. Cl. ............................... 228/180.1; 228/260; 228/37
[58] Field of Search ............... 228/180.1, 260, 37, 228/56.1; 118/314

[56] References Cited

U.S. PATENT DOCUMENTS

| | | | |
|---|---|---|---|
| 3,151,592 | 10/1964 | Wegener | 113/126 |
| 3,190,527 | 6/1965 | Tardoskegyi | 228/37 |
| 3,216,642 | 11/1965 | De Verter | 228/37 |
| 3,379,356 | 4/1968 | Eith | 228/37 |
| 3,500,536 | 3/1970 | Goldschmeid | 29/623 |
| 3,604,611 | 9/1971 | Lamberty | 228/36 |
| 3,605,244 | 9/1971 | osborne et al. | 29/471.1 |
| 3,612,388 | 10/1971 | Wegener | 228/34 |
| 3,705,457 | 12/1972 | Tardoskegyi | 29/494 |
| 3,726,007 | 4/1973 | Keller | 29/626 |
| 3,797,724 | 3/1974 | Flury et al. | 228/37 |
| 3,990,621 | 11/1976 | Boynton et al. | 228/37 |
| 4,208,002 | 6/1980 | Comerford et al. | 228/37 |
| 4,465,219 | 8/1984 | Kondo | 228/37 |
| 4,530,458 | 7/1985 | Kondo | 228/180.1 |
| 4,824,010 | 4/1989 | Inose et al. | 228/180.2 |
| 4,848,642 | 7/1989 | Kondo | 228/37 |
| 4,921,156 | 5/1990 | Hohnerlein | 228/37 |

FOREIGN PATENT DOCUMENTS

| | | | |
|---|---|---|---|
| 1099330 | 1/1068 | United Kingdom | 228/37 |
| 2008013 | 5/1979 | United Kingdom . | |

OTHER PUBLICATIONS

Kirsten Publication entitled "Hollow Wave Jet" believed to have been published in 1988.
Dee Dual Wave Soldering Machine, Dee Electric Company Brochure, published Sep. 1962.

Primary Examiner—Samuel M. Heinrich
Attorney, Agent, or Firm—Darby & Darby

[57] ABSTRACT

Two opposing hollow non-turbulent solder waves are provided which project inwards and solder is collected in a containment area. The two solder waves can have different flows and pressures, the first solder wave flooding the underside of a circuit board or other item and the second solder wave reducing a build up of solder. The soldering apparatus has a solder tank with a conveyor to convey items to a first solder wave and to a second solder wave. A solder containment area is provided between the two solder waves which receives solder from the solder waves and feeds the solder back into the solder tank.

32 Claims, 3 Drawing Sheets

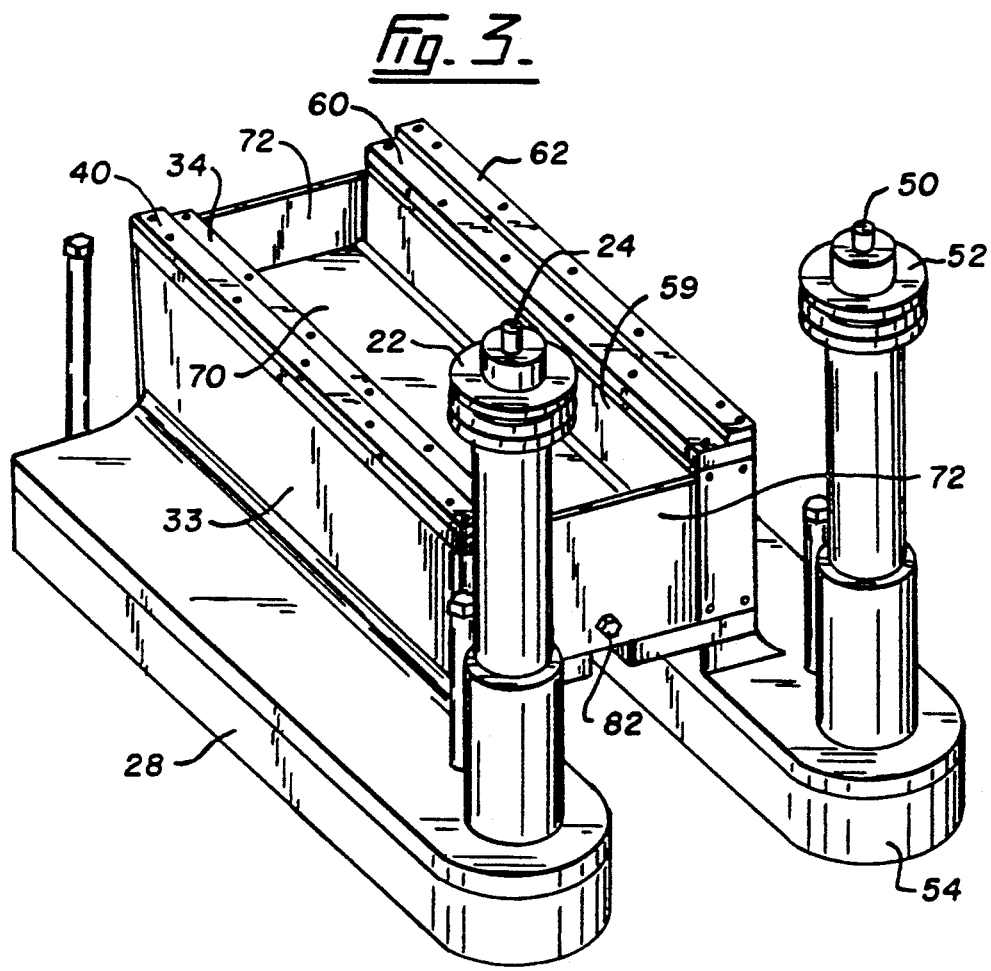
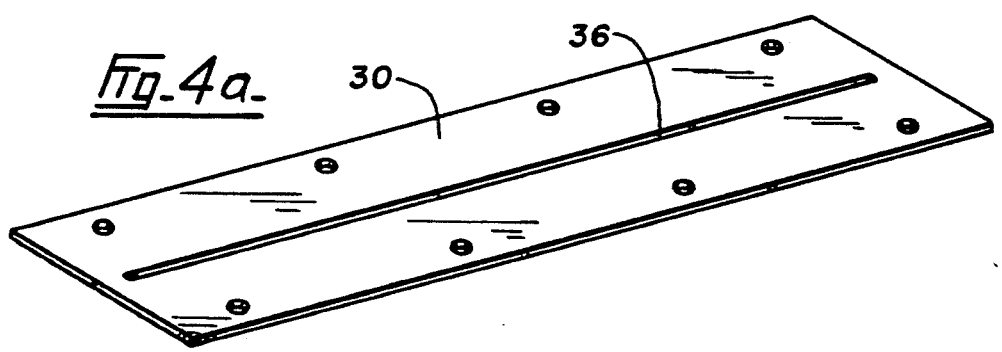
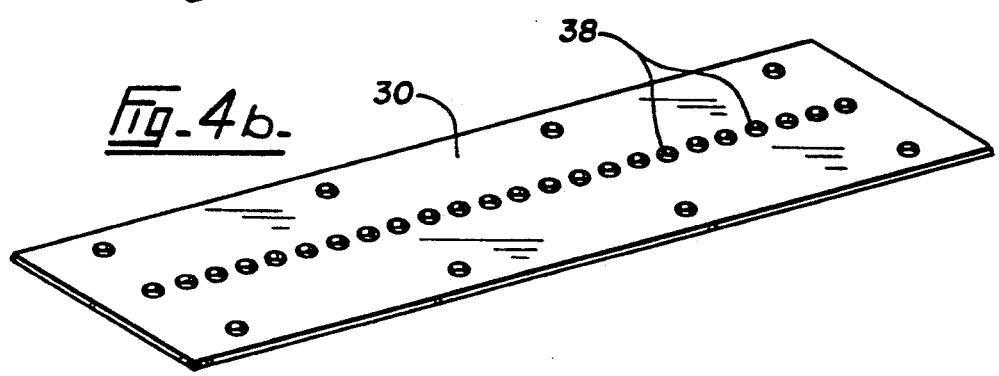

SOLDER APPARATUS WITH DUAL HOLLOW WAVE NOZZLES

TECHNICAL FIELD

The present invention relates to a wave type soldering apparatus and more specifically to two opposing hollow non-turbulent solder waves through which are conveyed items such as printed circuit boards and the like.

BACKGROUND ART

A hollow solder wave differentiates over the other types of solder wave in that it projects from a nozzle which may be a slit or, in some cases, one or more apertures, generally directed in one direction, and forms a cavity under the trajectory of the wave. The hollow solder wave is sometimes referred to as a solder fountain. The other types of solder wave flow up out of a nozzle and follow guides back into a solder reservoir. They do not project out of the nozzle in a trajectory such that a cavity is formed beneath the solder wave.

One example of a hollow solder wave, referred to as a solder fountain, is disclosed in U.S. Pat. No. 3,216,642 to De Verter. Other types of hollow solder waves are disclosed in U.S. Pat. Nos. 3,190,527 and 3,705,457 to Tardoskegyi.

In some wave soldering devices, two solder waves are arranged side-by-side. In many cases one of the solder waves flows out of the nozzle into trays or guides. One such nozzle produces a non-turbulent solder wave and is known as the Lambda type solder wave, disclosed by Elliott in U.S. Pat. No. 3,921,888. The second solder wave may be a similar to the first solder wave or, in some cases, may be a hollow solder wave. Examples of two solder waves, one being a hollow solder wave, is disclosed in U.S. Pat. No. 4,465,219 to Kondo and U.K. Patent 1,099,330 to Phillips Electronic and Associated Industries Limited. There are a number of reasons for two solder waves including speeding up the solder process, thus permitting circuit boards to be conveyed at higher speeds through the solder wave, ensuring that solder from the waves contacts all metallized surfaces on the circuit boards and reducing the probability of not soldering some joints as for example discrete chip capacitors or resistors glued to the bottom of a surface mount assembly board.

Over the years the types of printed circuit boards and other components to be soldered have changed. Pins and holes between components and boards are closer together, thus problems of bridging, which was overcome when spacings were greater, is occurring again due to the miniaturization of components mounted on circuit boards. Furthermore, there is always a requirement to speed up soldering circuit boards while, at the same time, avoid bridging or icicles occurring. One problem with a hollow solder wave solder is excessive splashing that occurs after the solder wave jets out from the nozzle, and curves over to fall back either into the reservoir or onto a deflector. This splashing action can cause dross to form on the surface of the solder in the reservoir, particularly when soldering occurs in air. Some present day soldering devices blanket the solder wave with a shield gas that substantially eliminates oxygen and this tends to reduce dross forming on the surface of the solder reservoir. However, there is still a requirement to reduce dross in soldering devices that apply solder in air. Excess dross is undesirable, wasteful, costly and exposes maintenance workers to lead or lead oxides which are present in the dross.

DISCLOSURE OF INVENTION

It is an aim of the present invention to provide a soldering apparatus that applies solder to metallized surfaces of printed circuit boards and the like, the soldered surfaces being evenly coated with solder and substantially bridge free. Furthermore, it is an aim of the present invention to provide a hollow non-turbulent solder wave apparatus wherein two solder waves, both being hollow and non-turbulent, are directed towards each other. One hollow solder wave has a different flow and different speed to a second solder wave such that the first solder wave floods the underside of the board with solder contacting all the metallized surfaces, and the second solder wave flushes the underside of the board to remove any bridges or icicles which might have been formed by the first solder wave. Furthermore, a containment area is provided between the two solder waves to catch solder before it falls too great a distance, and limit dross formation. Furthermore, any dross formed in the containment area is substantially all collected and preferably not transferred back to the solder tank, and through the solder pumps.

The present invention provides a soldering apparatus for soldering items comprising: a solder tank for containing solder, conveyor path over the solder tank with means to convey the items in the conveyor path, first solder pump means within the tank, first nozzle means for producing a first hollow non-turbulent solder wave to contact at least a portion of the items conveyed in the conveyor path, the first solder wave flowing in the same direction the items are conveyed, the first nozzle means fed from the first solder pump means, second solder pump means within the tank, located downstream in the direction the items are conveyed from the first solder pump means, second nozzle means located downstream from the first nozzle means, the second nozzle means for producing a second hollow non-turbulent solder wave to contact at least a portion of the items conveyed in the conveyor path, the second solder wave flowing opposite the direction the items are conveyed, the second nozzle means fed from the second solder pump means, at least one solder containment area between the first nozzle means and the second nozzle means to receive solder from the first solder wave and the second solder wave, and means to return solder from the containment area to the solder tank.

In another embodiment there is provided a method for soldering items comprising the steps of: conveying the items in a conveyor path over a solder tank, producing a first hollow non-turbulent solder wave above the solder tank to contact at least a portion of the items conveyed in the conveyor path, the first solder wave flowing in the same direction the items are conveyed, producing a second hollow non-turbulent solder wave above the solder tank, the second solder wave located downstream in the direction the items are conveyed from the first solder wave, to contact at least a portion of the items conveyed in the conveyor path, the second solder wave flowing opposite to the direction the items are conveyed, collecting the solder from the first solder wave and the second solder wave in at least one containment area between the first solder wave and the second solder wave, and returning the solder from the containment area to the solder tank.

BRIEF DESCRIPTION OF DRAWINGS

In drawings which illustrate embodiments of the present invention,

FIG. 3 is an isometric view showing the soldering apparatus of FIG. 1, FIGS. 4a and 4b are isometric views of choke plates suitable for the soldering apparatus of the present invention.

MODES FOR CARRYING OUT THE INVENTION

Figure 1:
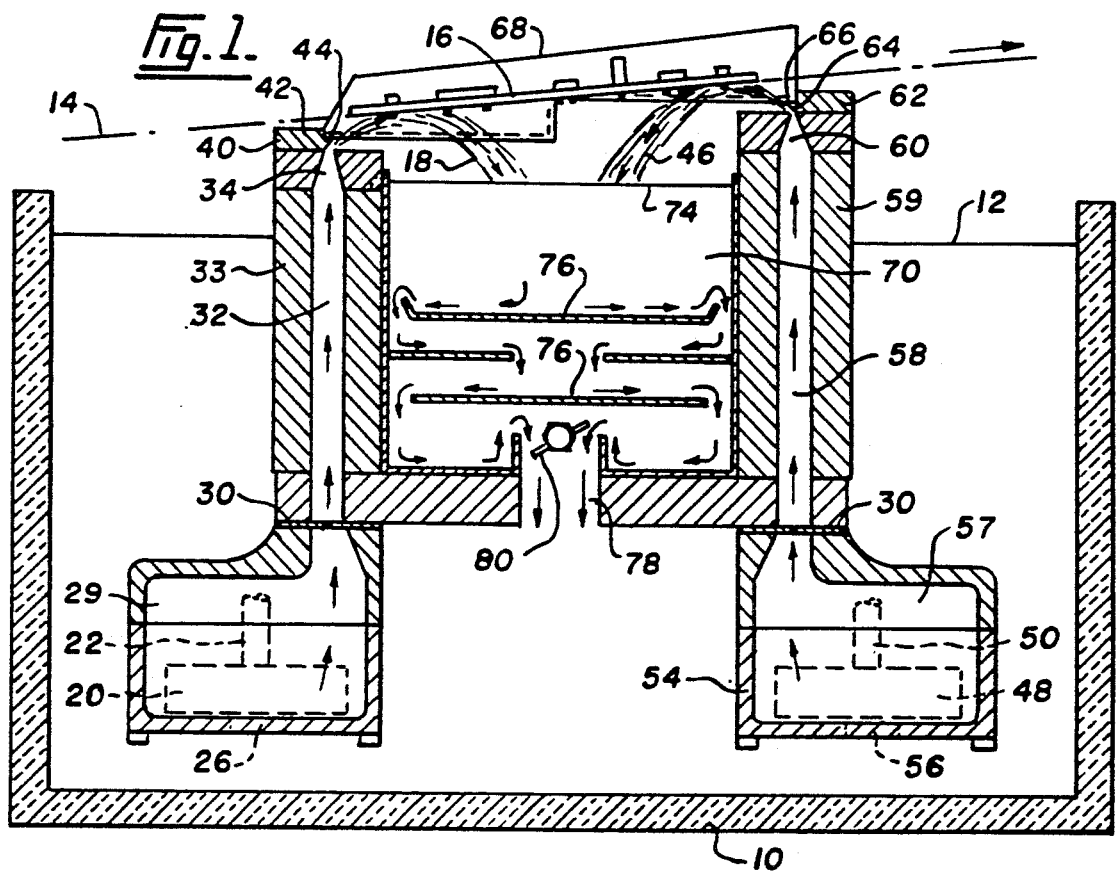
FIG. 1 is a cross-sectional view showing one embodiment of a double nozzle hollow wave soldering apparatus according to the present invention.
Figure 2:
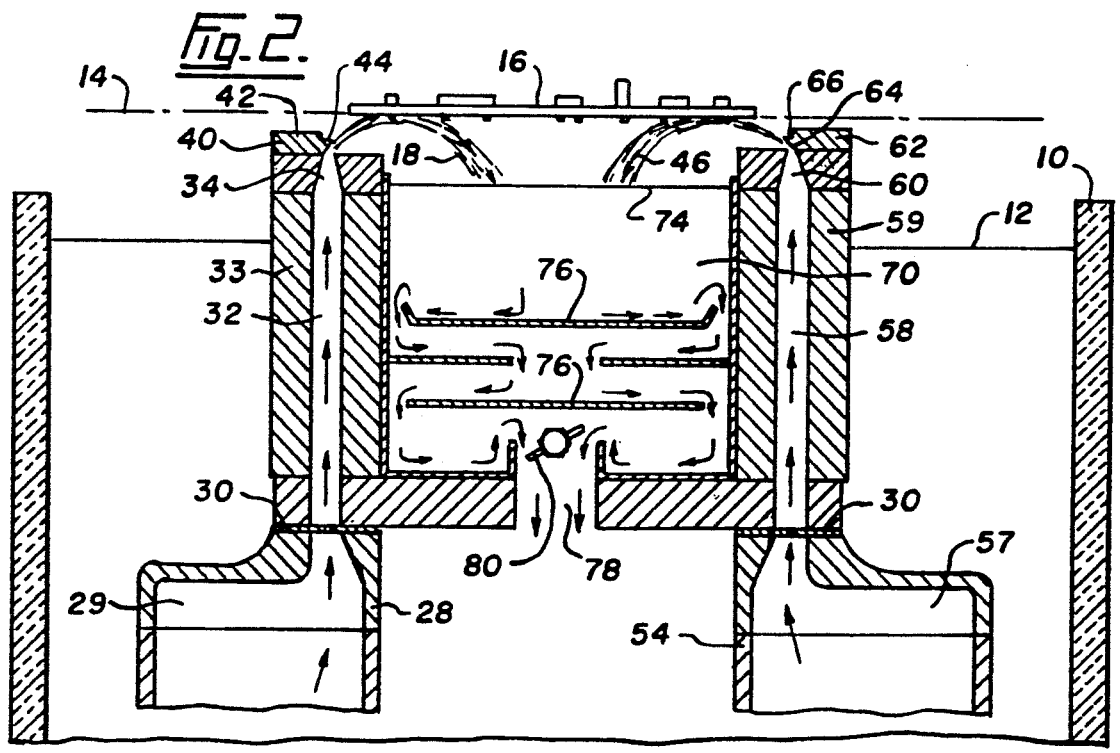
FIG. 2 is a cross-sectional elevational view of another embodiment of a double nozzle hollow wave soldering apparatus according to the present invention.

Referring now to the drawings, a solder tank 10 is shown in FIGS. 1 and 2 having solder therein to a solder level 12. A conveyor 14, indicated by a dotted line which in FIG. 1 is sloped upwards, conveys printed circuit boards 16 or other items to be soldered over the top of the solder tank 10. A first solder wave 18 is produced from an impeller 20 rotating on a shaft 22 which in turn is driven by a pulley wheel 24 as shown in FIG. 3. The impeller is rotated by a motor and belt (not shown) and solder is drawn through an aperture 26 in the underside of the casing 28 into a first pressure chamber 29. As can be seen in FIG. 3, the first pressure chamber 29 extends for the full width of the required solder wave 18. Solder within the first pressure chamber 29 passes upwards through a choke plate 30 into an upper second pressure chamber 32, a riser 33 leading to a first nozzle 34.

As seen in FIGS. 4a and 4b, the choke plate 30 has either a slot 36 (FIG. 4a) in the center thereof, or a row of holes 38 (FIGS. 4b). The area of the slot 36 or holes 38 in the choke plate 30 represents approximately half the area of the nozzle opening 34. This provides a higher solder pressure in the first pressure chamber 29 over the second pressure chamber 32.

The first nozzle 34 is tapered upwards at an angle from the inside of the second pressure chamber 32 with no steps therein thus ensuring a streamline flow. Solder passes through the nozzle opening 34 and is directed at an angle by a nozzle plate 40 attached on the upstream side of the nozzle opening 34. For the first solder wave 18, the nozzle plate 40 in one embodiment is constructed to direct the solder flow at an angle of approximately 65°. The angular portion 42 of the nozzle plate 40 is approximately half the thickness of the nozzle plate 40 and a step 44 is provided above the angular portion 42. It has been found that by keeping the angular portion 42 at approximately ⅛ inch vertical thickness, a nonturbulent solder wave is formed.

A second solder wave 46 is shown downstream from the first solder wave 18. Both solder waves 18 and 46 are directed towards each other. The first solder wave 18 is directed in the direction the circuit board 16 moves in the conveyor path 14 and the second solder wave 46 is directed counter to the direction the circuit board 16 moves in the conveyor path 14.

The second solder wave 46, like the first solder wave 18, has an impeller 48 connected to shaft 50 which in turn is rotated by a pulley 52. The impeller 48 rotates within a second impeller casing 54 to pump solder up through an aperture 56 in the bottom of the casing 54 into a first pressure chamber, through a choke plate 30, similar to that shown in FIGS. 4a and 4b, to enter an upper second pressure chamber 58 in a riser 59 leading to a second nozzle 60 which has a nozzle plate 62 attached on the downstream side of the second nozzle 60 to direct solder to form the second solder wave 46. An angular portion 64 of the second nozzle plate 62 is adapted to direct the solder flow at an angle, which in one embodiment is approximately 45°, as compared to the 65° angle from the first solder wave 18.

Figure 5:
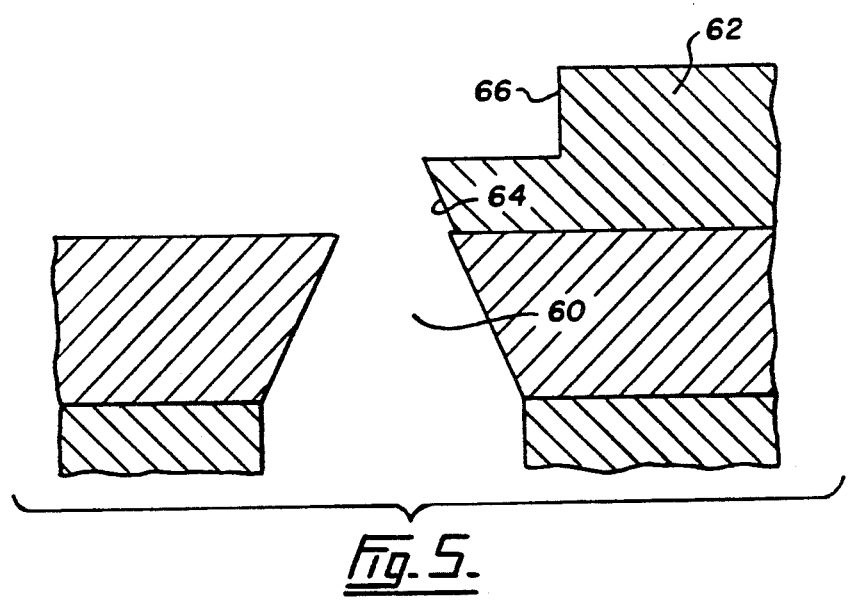
FIG. 5 is a cross-sectional detail view of a nozzle arrangement according to one embodiment of the invention.

A detail of the second nozzle is shown in FIG. 5. As can be seen, the nozzle plate 62 has a deflector surface 64 which deflects the solder after it leaves the nozzle 60. The deflector surface 64 may have a fixed angle or may be adjustable. The first nozzle is a similar configuration to the second nozzle.

The first nozzle plate 40 and the second nozzle plate 62 are both interchangeable, thus, if desired, nozzle plates with different angular portions 42 and 64 may be used to direct the solder waves 18 and 46 at different angles from the nozzles 34 and 36. A step 66 is provided in the second nozzle plate 62 above the angular portion 64. A sliding mask 68, shown in FIG. 1, fits into the step 44 on the first nozzle plate 40 and step 66 on the second nozzle plate 62 and may be slid across the face of the two nozzles to cut off sections of the nozzles to restrict the width of the solder waves 18,46 thus adjusting the solder wave to the items to be soldered.

As stated, it is preferred that the angles of the first solder wave 18 and the second solder wave 46 be different and the selection of these angles is primarily to ensure that solder from the first solder wave 18 contacts all the metallized surfaces of the circuit board 16 and solder from the second solder wave 46, which flows counter to the first solder wave 18, removes any bridges or icicles that may have been formed by the first solder wave 18. In one embodiment the first nozzle opening 34 is approximately 0.060 inches wide and the second nozzle opening 60 is in the range of 0.045 to 0.050 inches wide. The area of the openings 36 and 38 in the choke plate 30 preferably correspond to half the area of the first and second nozzle openings 34,60. The angular portion 44 for the first nozzle 34 preferably has an angle in the range of 60° to 65° and the angular portion 64 for the second nozzle 60 is preferably in the range of 40° to 50°. The solder flow is greater through the first nozzle 34 to ensure that the solder washes up to contact all the metallized surfaces. The solder flow is controlled by the rotational speed of the impeller 20. For the second nozzle 60, the flow of solder is less, however, because the width of the nozzle opening 60 is less, the jet has a higher pressure thus providing a washing effect to remove solder bridges or icicles that may form.

The first solder wave 18 and the second solder wave 46 fall into a containment area 70 having side plates 72 at each end joined to the risers 33,59 for the first and second solder waves as shown in FIG. 3. The containment area 70 contains a solder level 74 considerably higher than the solder level 12 in the solder tank 10 and is as high as possible so that the first and second solder waves 18 and 46 do not have far to fall before reaching the solder level 74. By keeping the distance the solder falls to a minimum, less splashing occurs and this restricts the formation of dross on the surface of the solder.

A plurality of baffles 76 are arranged in the containment area 70, so that the solder slowly flows in a circuitous path through the containment area 70, passing into the solder tank 10 through an aperture 78 having a throttle vane 80 therein. The throttle vane permits the aperture 78 to be varied to control the solder level 74 in the containment area 70. A control knob 82, shown in FIG. 3, permits adjustment of throttle vane 80. The baffles 76 are removable for cleaning purposes. The baffles 76 act to trap dross. The top baffle 76 has raised edges to form a tray. As the solder slowly moves downwards through the baffles 76 the dross collects on these baffles and the baffles may be removed for cleaning purposes when the solder waves are turned off.

In another embodiment an oil injection arrangement is added to supply oil to the containment area 70 to assist in restricting dross formation. The oil remains on the surface of the solder in the containment area 70 and does not migrate through to the solder tank 10 when the solder waves are in operation.

Another embodiment of the present invention is shown in FIG. 2 wherein the conveyor path 14 is substantially horizontal. In FIG. 1 the elevations of the first nozzle 34 and the second nozzle 60 are at different heights to take into account the sloped conveyor 14. FIG. 2 shows the arrangement wherein the elevations of the two nozzles 34 and 60 are the same. First nozzle plates 40 and second nozzle plates 62 with different angles for the angular portions 42 and 64 vary the angles of the first solder wave 18 and second solder wave 46 as desired. Variations in the solder flows for the first and second solder waves 18 and 46 area also made in accordance with the particular item being soldered. It is preferable that the first solder wave 18 has a higher flow than the second solder wave 46 and the second solder wave 46 has a higher pressure from the nozzle 60 as the effect of the second solder wave 46 is primarily a washing effect to remove solder bridges and icicles.

Figure 6:
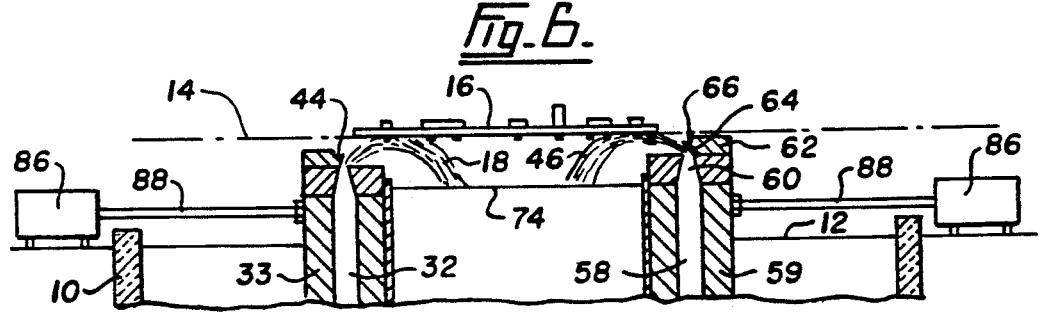
FIG. 6 is a cross-sectional view of yet another embodiment of a double nozzle hollow wave soldering apparatus with a vibrator attached to risers for the solder wave nozzles.

In FIG. 6, another embodiment of the soldering apparatus shows vibrators 86 positioned outside the solder reservoir 10 have connecting rods 88 which are attached to the top of the riser 33 for the first nozzle and the top of the riser 59 for the second nozzle. The vibrators 86 are turned on at a high amplitude for a short period of time for cleaning purposes. With the solder pumps on, the vibration causes a cleaning action to dislodge any dross particles that clog or could clog the nozzles 34,60. The vibrators 86 are turned on at a lower amplitude when items are being soldered to assist in wetting surfaces to be soldered and wick up into holes.

Figure 7:
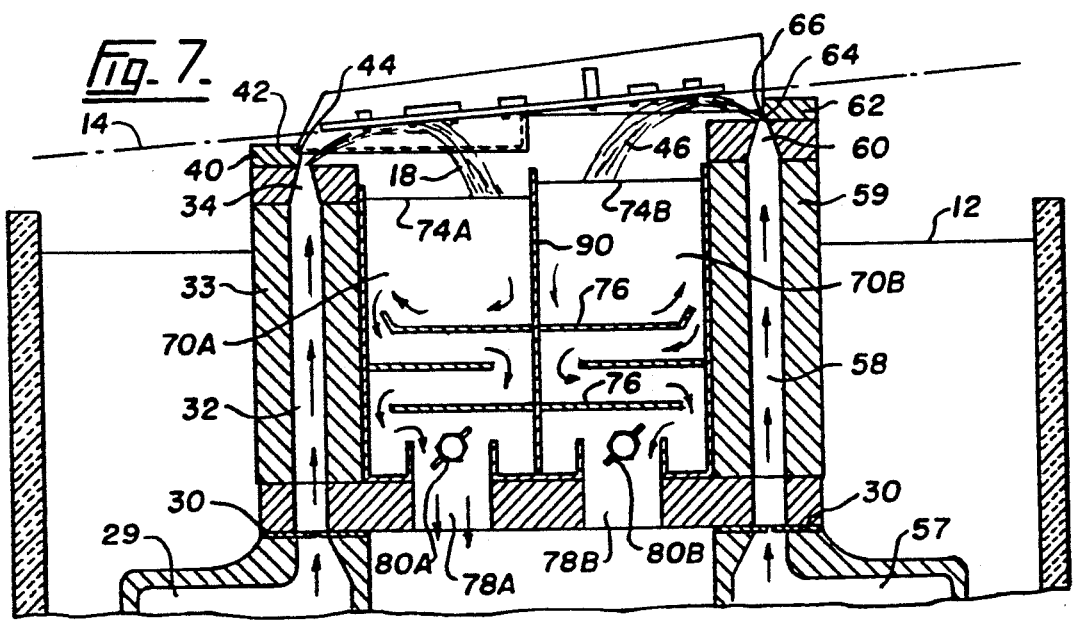
FIG. 7 is a cross-sectional elevational view showing a further embodiment of a double nozzle hollow wave soldering apparatus according to the present invention.

Yet a further embodiment is shown in FIG. 7 wherein a divider 90 is placed in the containment area 70 dividing the containment area into two. Two throttle vanes 80A,80B are provided in two apertures 78A,78B so that the solder levels 74A,74B can be different in the two containment areas 70A,70B. The baffles 76 remain in place so the solder in each area moves downwards slowly. The two solder levels 74A,74B are advantageous when the first solder wave 18 and the second solder wave 46 are at different elevations, for example when the conveyor 14 is sloping upwards.

Both solder waves 18 and 46 are non-turbulent and this is caused by a combination of at least one of several factors including impeller selection, proper sealing of the casings, difference in solder pressure between the first pressure zone and the second pressure zone, streamline passages and conduits from the impeller to the nozzles, width of nozzle openings, height of angular portions on the nozzle plates and angles of the angular portions.

Whereas no housing is shown above the solder tank, in certain circumstances a housing may be provided for containing a shield gas to exclude oxygen from the solder surface. Alternatively, a shield gas may be provided through diffusers or other means around the solder waves 18 and 46 to reduce dross formation.

Various changes may be made to the embodiments shown herein without departing from the scope of the present invention which is limited only by the following claims.

The embodiments of the present invention in which an exclusive property or privilege is claimed are defined as follows:

1. A soldering apparatus for soldering items comprising:
   a solder tank for containing solder,
   conveyor path over the solder tank with means to convey the items in the conveyor path,
   first solder pump means within the tank,
   first nozzle means for producing a first hollow non-turbulent solder wave to contact at least a portion of the items conveyed in the conveyor path, the first solder wave flowing in the same direction the items are conveyed, the first nozzle means fed from the first solder pump means,
   second solder pump means within the tank, located downstream in the direction the items are conveyed from the first solder pump means,
   second nozzle means located downstream from the first nozzle means, the second nozzle means for producing a second hollow non-turbulent solder wave to contact at least a portion of the items conveyed in the conveyor path, the second solder wave flowing opposite the direction the items are conveyed, the second nozzle means fed from the second solder pump means,
   at least one solder containment area between the first nozzle means and the second nozzle means to receive solder from the first solder wave and the second solder wave, and to
   means to return solder from the containment area the solder tank.

2. The soldering apparatus according to claim 1 wherein the first solder pump means and the second solder pump means are contained within a first chamber in the solder tank, including a choke plate provided above each first chamber leading to a second chamber above the choke plate and beneath the nozzle means.

3. The soldering apparatus according to claim 2 wherein pressure of solder in the first chamber is higher than pressure of solder in the second chamber.

4. The soldering apparatus according to claim 1 wherein the first nozzle means includes a first tapered nozzle having a first nozzle plate mounted on an upstream side of the first nozzle means with a first angular portion to direct the first solder wave, and the second nozzle means includes a second tapered nozzle with a second nozzle plate mounted on a downstream side of the second nozzle means with a second angular portion to direct the second solder wave.

5. The soldering apparatus according to claim 4 wherein the first nozzle plate and the second nozzle plate are removable.

6. The soldering apparatus according to claim 4 wherein the angular portion of the first and second nozzle plates have a depth of approximately ⅛ inch.

7. The soldering apparatus according to claim 4 wherein the first nozzle means has an opening of about 0.060 inches wide and the angular portion has an angle in the range of about 60° to 65°.

8. The soldering apparatus according to claim 7 wherein the second nozzle means has an opening in the range of about 0.045 to 0.050 inches and the angular portion has an angle in the range of about 40° to 50°.

9. The soldering apparatus according to claim 1 wherein the first hollow non-turbulent solder wave has a greater solder flow than the second hollow non-turbulent solder wave.

10. The soldering apparatus according to claim 1 wherein the second hollow non-turbulent solder wave has at least as great a solder pressure as the first hollow non-turbulent solder wave.

11. The soldering apparatus according to claim 1 wherein the conveyor path slopes upwards in the same direction the items are conveyed.

12. The soldering apparatus according to claim 1 wherein the conveyor path is substantially horizontal.

13. The soldering apparatus according to claim 11 wherein the second nozzle means has a higher elevation than the first nozzle means.

14. The soldering apparatus according to claim 1 wherein the solder containment area has solder retaining means to retain a solder level at a higher elevation than a solder level in the solder tank.

15. The soldering apparatus according to claim 14 wherein the solder retaining means comprises a riser for the first nozzle means and a riser for the second nozzle means, with side plates between the risers.

16. The soldering apparatus according to claim 14 wherein the solder retaining means to retain a solder level at a higher elevation is an adjustable vane in an opening from the containment area to the solder tank.

17. The soldering apparatus according to claim 14 including baffles within the containment area to increase flow time for solder flowing through the containment area to the tank, the baffles having surfaces for collection of dross.

18. The soldering apparatus according to claim 17 wherein the baffles are removable.

19. The soldering apparatus according to claim 1 including a first vibration means for the first nozzle means and a second vibration means for the second nozzle means.

20. The soldering apparatus according to claim 1 including two solder containment areas, one containment area to receive solder from the first solder wave and the other containment area to receive solder from the second solder wave.

21. The soldering apparatus according to claim 20 wherein the two containment areas each have solder retaining means to retain solder levels at a higher elevation than a solder level in the solder tank.

22. A method for soldering items comprising the steps of:
conveying the items in a conveyor path over a solder tank,
producing a first hollow non-turbulent solder wave above the solder tank to contact at least a portion of the items conveyed in the conveyor path, the first solder wave flowing in the same direction the items are conveyed,
producing a second hollow non-turbulent solder wave above the solder tank, the second solder wave located downstream in the direction the items are conveyed from the first solder wave, to contact at least a portion of the items conveyed in the conveyor path, the second solder wave flowing opposite to the direction the items are conveyed,
collecting the solder from the first solder wave and the second solder wave in at least one containment area between the first solder wave and the second solder wave, and
returning the solder from the containment area to the solder tank.

23. The method for soldering according to claim 22 wherein the solder returning from the containment area to the solder tank is controlled to retain a solder level in the containment area at a higher elevation than a solder level in the solder tank.

24. The method for soldering according to claim 22 wherein the first solder wave has at least the same flow as the second solder wave.

25. The method of soldering according to claim 23 wherein the second solder wave has at least the same pressure as the first solder wave.

26. The method for soldering items according to claim 22 wherein angles of projection of the first and second solder waves are set by nozzle plate means.

27. The method for soldering items according to claim 22 wherein the conveyor path slopes upwards in the same direction the items are conveyed.

28. The method for soldering items according to claim 22 wherein the conveyor path is substantially horizontal.

29. The method for soldering items according to claim 22 wherein movable baffles in the containment area collect dross and restrict flow of solder from the containment area to the solder tank.

30. The method for soldering items according to claim 22 wherein the first solder wave projects from a first solder nozzle and the second solder wave projects from a second solder nozzle, and wherein the first and second solder nozzles are vibrated when the items are conveyed through the first and second solder waves.

31. The method for soldering items according to claim 22 wherein the solder from the first solder wave is collected in one containment area and the solder from the second solder wave is collected in another containment area.

32. The method for soldering items according to claim 31 wherein solder level in the one containment area and solder level in the other containment area is maintained at higher elevations than a solder level in the solder tank.

* * * * *